(12) United States Patent
Bruss (10) Patent No.: US 8,589,473 B2
(45) Date of Patent: Nov. 19, 2013

(54) TECHNIQUE FOR HANDLING INITIATION REQUESTS

(75) Inventor: Jorg Bruss, Eschweiler (DE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 411 days.

(21) Appl. No.: 11/569,158

(22) PCT Filed: May 19, 2004

(86) PCT No.: PCT/EP2004/005438
§ 371 (c)(1), (2), (4) Date: Nov. 15, 2006

(87) PCT Pub. No.: WO2005/112384
PCT Pub. Date: Nov. 24, 2005

(65) Prior Publication Data
US 2008/0028081 A1    Jan. 31, 2008

(51) Int. Cl.
*G06F 15/16* (2006.01)
*G06F 7/04* (2006.01)

(52) U.S. Cl.
USPC ............................... 709/203; 709/228; 726/4

(58) Field of Classification Search
USPC .......... 709/202, 203, 217, 218, 219, 227, 229
See application file for complete search history.

(56) References Cited

U.S. PATENT DOCUMENTS

| | | | |
|---|---|---|---|
| 7,080,158 B1* | 7/2006 | Squire | 709/245 |
| 7,145,875 B2* | 12/2006 | Allison et al. | 370/230.1 |
| 7,472,200 B1* | 12/2008 | Taylor et al. | 709/238 |
| 2002/0138618 A1* | 9/2002 | Szabo | 709/225 |
| 2002/0188740 A1* | 12/2002 | Tang et al. | 709/230 |
| 2002/0196802 A1* | 12/2002 | Sakov et al. | 370/432 |
| 2003/0120716 A1* | 6/2003 | McClellan et al. | 709/201 |
| 2003/0154283 A1 | 8/2003 | Brown | |
| 2004/0093415 A1* | 5/2004 | Thomas | 709/227 |
| 2004/0093416 A1* | 5/2004 | Thomas | 709/227 |
| 2004/0133637 A1* | 7/2004 | Wesinger, Jr. et al. | 709/203 |
| 2004/0215792 A1* | 10/2004 | Koning et al. | 709/229 |
| 2005/0038890 A1* | 2/2005 | Masuda et al. | 709/224 |

(Continued)

FOREIGN PATENT DOCUMENTS

| | | | | |
|---|---|---|---|---|
| WO | WO 01/22688 | * | 3/2001 | H04L 29/06 |
| WO | WO 01/22688 A | | 3/2001 | |

(Continued)

OTHER PUBLICATIONS

Stewart, R et al: 'Stream Control Transmission Protocol': RFC2960, Oct. 2000.

(Continued)

*Primary Examiner* — Joseph Avellino
*Assistant Examiner* — Aftab Nasir Khan (57) ABSTRACT

A technique is described for handling initiation requests directed to a contact host from a plurality of clients that enables the handling of large number of requests and provides design stage flexibility. A contact host receives the requests from the clients. Thereafter, an acknowledgment is sent to each requesting client so that direct data transfer may commence between the client and server bypassing the contact host. This acknowledgment may be generated and sent by either the contact host or by the associated server In some variations, each request is authenticated prior to the association of each request.

11 Claims, 4 Drawing Sheets

(56) References Cited

U.S. PATENT DOCUMENTS

| | | | |
|---|---|---|---|
| 2005/0091307 A1* | 4/2005 | Venkatsubra et al. | 709/203 |
| 2005/0125553 A1* | 6/2005 | Wu et al. | 709/233 |
| 2005/0265315 A1* | 12/2005 | Edgar | 370/352 |
| 2006/0161577 A1* | 7/2006 | Kulkarni et al. | 707/102 |
| 2007/0208810 A1* | 9/2007 | Mostafa | 709/206 |
| 2007/0288639 A1* | 12/2007 | Brown | 709/226 |
| 2008/0250146 A1* | 10/2008 | Arwe et al. | 709/227 |
| 2009/0077246 A1* | 3/2009 | Lee | 709/229 |

FOREIGN PATENT DOCUMENTS

| | | | | | |
|---|---|---|---|---|---|
| WO | WO 01/35593 | A2 | | 5/2001 | |
| WO | WO 02 17034 | A2 | | 2/2002 | |
| WO | WO 02/51095 | | * | 6/2002 | H04L 29/06 |
| WO | WO 02/51095 | A | | 6/2002 | |
| WO | WO 03/041355 | | * | 5/2003 | H04L 29/06 |
| WO | WO 03/041355 | A | | 5/2003 | |

OTHER PUBLICATIONS

European Patent Office International Search Report issued Nov. 19, 2004 for PCT/EP20041005438.

* cited by examiner

TECHNIQUE FOR HANDLING INITIATION REQUESTS

FIELD OF THE INVENTION

The invention relates to communications. More specifically, the invention relates to a technique for handling initiation requests associated with acknowledged transport protocols.

BACKGROUND OF THE INVENTION

Reliable transport protocols operating on top of IP, such as Streaming Control Transmission Protocol (SCTP), are often used by network components (e.g., clients, etc.) communicating with application servers via Application Protocol Data Units (APDU) over established connections (e.g., a connection-oriented service such as that provided by SCTP). With such arrangements, network components typically use a host server cluster which may, in part, be based on a requirement for each network component to have several physical resources associated therewith for scalability purposes.

Figure 1:
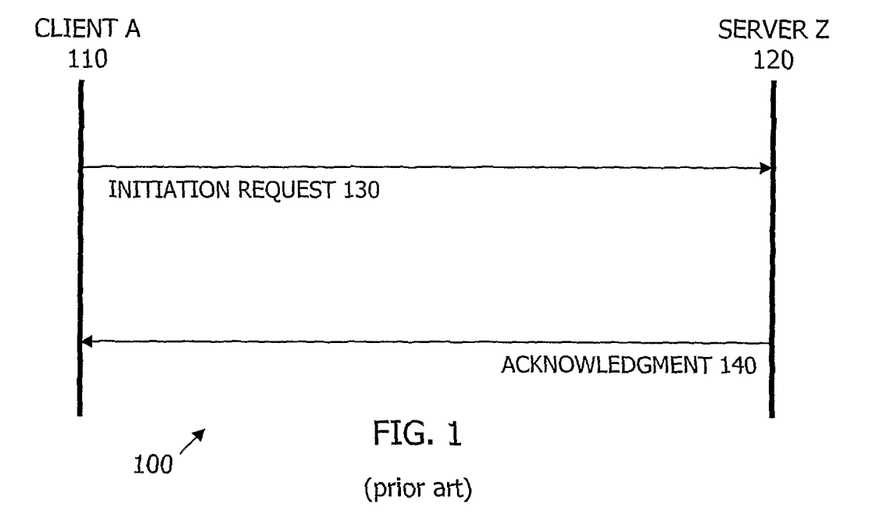
FIG. 1 is a signaling diagram illustrating a conventional technique for exchanging initiation requests and acknowledgments between a client and a server.

FIG. 1 illustrates SCTP signaling 100 relating to the establishment of an association (for an application data transfer, etc.) between a client 110 (end point EP A) and a server 120 (end point EP Z). Several transport addresses are associated with the client 100 (i.e., it is a multi-homed end point) comprising pairs of valid IP addresses for the client and the port number chosen for the client (which is typically only valid for the lifetime of the SCTP association). The IP addresses are given as the list {IP A1, . . . , IP An} and the port number is indicated as P A.

Similarly, there are transport addresses for the server 120, that are pairs created from the IP addresses of the list {IP Z1, . . . , IP Zm} and the port number P Z. Often, the port number for the server 120 is a well-known port defined for a particular application on top of SCTP (e.g., port number 2905 as defined in the protocol for MTP3 User Adaption Layer (M3UA)). In any event, the port number and the IP addresses associated with the server 120 (and/or the corresponding application) must be known by all clients 110.

The process for establishing an association commences with the client 110 sending an initiation request (e.g., an INIT packet in the case of SCTP) 130 to the server 120 via one of the valid IP addresses for the server 120 and the server port number. The request 130 will include a list of IP addresses and the port number valid for the client 110, indicated as the IP address list and the port number. An example request 130 might contain the following: destination IP address=IP Zy; source IP address=IP Ax; (source port=P A; destination port=P Z; chunk=INIT; end point IP addresses={IP A1, . . . , IP An}). While the destination IP address and the source IP address are usually included in the IP packet header, the remaining parameters in brackets are sent as SCTP packet header that is included in the IP packet payload.

In response, the server 120 will reply with an acknowledgment (e.g., an INIT ACK message in the case of SCTP) 140 if it accepts the initiation request 130. The acknowledgment 140 is directed to the same address from which the request 130 was received, but it may be sent by the server 120 from a different address than the one that received the INIT message (e.g., IP address Zz). The acknowledgment 140 will also include data defining the end point of the server 120, such as the valid IP addresses and the same port number as already used as the destination port number in the INIT messages. A sample acknowledgment 130 might include the following: destination IP address=IP Ax; source IP address=IP Zz; (source port=P Z; destination port=P A; chunk=INIT ACK; end point IP addresses={IP Z1, . . . , IP Zm}). After this acknowledgment has been received by the client 110, several more messages may be exchanged (i.e., hand-shaking may take place) for security purposes and so that the various transport addresses are known for each end point to choose among them as may be required to exchange payload data.

The above described conventional manner in which SCTP associations are established is susceptible to denial of service (DoS) attacks as massive number of automated requests to various servers can cripple communication exchanges (by effectively disabling the servers). While it may be possible, in some circumstances, to scale up processing power by adding further servers and building server clusters when traffic demands are high, the various clients must be informed how to best use additional resources. Accordingly, load-balancing cannot be achieved without coordination between all of the various clients. While Domain Name System (DNS) may provide some benefits regarding load sharing, the use of DNS and corresponding domain names can be overly cumbersome for some applications.

In an analogous art, routers, such as Internet routers, are used to determine how data is sent to its intended destination via the most efficient route. In addition, routers are used to segment traffic (by, for example, monitoring the transmission of each data packet) and provide redundancy of routes. While this arrangement can act to ensure that data is transferred to a recipient in an efficient manner, routers are susceptible to overloading during heavy data traffic.

US 2002/0138618 A1 discloses a connection management technique that is implemented using a load balancing server array controller arranged between an internal network and an external network. The controller receives connection requests from the external network, transforms the connection requests and forwards the transformed connection requests to a selected content server. Responsive to the transformed connection request, the content server sends a TCP/IP acknowledgement message to the controller. The controller then transforms the acknowledgement message and forwards the transformed acknowledgment message to the client from which the connection request has originally been received.

Accordingly, it will be appreciated that there remains a need for an improved technique for receiving and acknowledging a high volume of initiation requests that can be modified without significant coordination with a multitude of clients.

SUMMARY OF THE INVENTION

The invention may be embodied in a method for handling initiation (or establishment) requests directed to a contact host from a plurality of clients. Such a method comprises the steps of receiving, by the contact host, the requests, associating, by the contact host, each request with a server, and acknowledging the receipt of each request to initiate data transfer directly between the client and the associated server.

Depending on the desired configuration, the acknowledgment may be sent by either the associated server or by the contact host. With the former arrangement, the method may further comprise the step of receiving, by the associated server from the corresponding client, a confirmation that data transfer is to commence. In addition, other messages may be exchanged to initialize data transfer.

The method may further comprise the step of routing, by the contact host, the requests to the associated servers so that the associated servers may acknowledge each request. This routing may solely consist of the initial request, or it may include additional messaging received by the contact host from the requesting client after the initial request.

As previously stated, the contact host may acknowledge the request directly to the corresponding client rather than having the associated server acknowledge the request. With this variation, the method may also include the step of receiving, by the contact host from the acknowledged client, a confirmation that data transfer is to commence. The method may also include the step of forwarding any messages from a requesting client, by the contact host to the associated server, after the data transfer has commenced and/or after the request has been received by the contact host. Alternatively, the method may include the step of discarding any messages received by the contact host from a client after the data transfer has commenced and/or after the request has been received by the contact host. Discarding the messages causes the client to classify the contact host as a non-responsive and/or inactive typically resulting in the client resorting to another transport address.

The method may provide that the acknowledgment includes at least one IP address for the associated server. Multiple IP addresses may be included when the associated server is a multi-homed host. One example of a protocol that may use multi-homed hosts and is compatible with the method is Streaming Control Transmission Protocol. In addition, the method may also include the initial step of providing the contact host with a single address to accept requests to initially prevent direct access to the servers by the clients.

The association step may select the associated server according to a round robin scheme or it may determine the loads on the associated servers and select the associated server according to a load balancing scheme. These types of association allow for more flexibility in the configuration of a system in that only the address(es) for the contact host must be known when the request is generated.

The method may dynamically assign, by the contact host, addresses to the servers. The dynamic assignment may use a scheme such as DHCP, stateless auto-configuration, stateful auto-configuration, NAT, and NAPT and similar schemes.

In some variations, the method also includes the step of arranging the contact host to reside on a separate physical resource than the server. However, in other variations, the method includes the step of arranging the contact host to reside on the same physical resource as the server. In addition, the method may also include the step of arranging the servers as a cluster on a single network node to provide connectivity to an application service or it may also include the step of arranging the servers as clusters on two or more network nodes to provide connectivity to an application service.

To further insulate the servers with direct contact with the clients (to prevent, inter alia, denial of service attacks), the method may further comprise the step of authenticating, by the contact host, each request. The authentication may, for example, be based on the IP address(es) indicated in the request or other identifiers associated with the client.

The invention may also be embodied in a computer program product comprising program code portions for performing the steps of any of the methods disclosed herein when the computer program product is run on a computer system. Such a computer program product, depending on the desired implementation, may be stored on a computer readable recording medium.

In yet another embodiment, a system comprising a computer processor and a memory coupled to the processor is provided. The memory of this system may be encoded with one or more programs that may perform the steps of any of the methods disclosed herein.

The invention may also comprise a contact host for handling initiation requests received from a plurality of clients. The contact host may include a receiving unit for receiving the requests, an association unit for associating each request with a server, and an acknowledgment unit for initiating an acknowledgment to each requesting client to establish a data transfer channel between at least one requesting client and the associated server, the data transfer channel bypassing the contact host. In some variations, the initiation unit routes the requests to the associated servers so that the associated servers may acknowledge each request. In other variations, the initiation unit directly acknowledges each request. The acknowledgment initiated by the initiation unit may include at least one IP address for the associated server. In addition, the contact host may further comprise an authentication unit for authenticating each request.

The invention may also be provided in a system comprising a plurality of clients for generating data transfer initiation requests, a plurality of servers for handling the data transfer requested by the plurality of clients, and a contact host for handling initiation requests received from the plurality of clients. The contact host includes a receiving unit for receiving the requests, an association unit for associating each request with a server, and an acknowledgment unit for initiating an acknowledgment to each requesting client. Additionally, the system comprises a data transfer channel between at least one requesting client and the associated server, the data transfer channel bypassing the contact host.

BRIEF DESCRIPTION OF THE DRAWINGS

Further details, embodiments, modifications and enhancements of the present invention may be obtained from consideration of the following description of various illustrative embodiments of the invention in conjunction with the drawings, in which.

DETAILED DESCRIPTION OF PREFERRED EMBODIMENTS

In the following description, for purposes of explanation and not limitation, specific details are set forth, such as particular sequences of steps and various configurations, etc. in order to provide a thorough understanding of the present invention. It will be apparent to one skilled in the art that the present invention may be practiced in other embodiments that depart from these specific details. Moreover, those skilled in the art will appreciate that the functions explained herein below may be implemented using software functioning in conjunction with a programmed microprocessor or general purpose computer, and/or using an application specific integrated circuit (ASIC). It will also be appreciated that while the current invention is primarily described as a method, it may also be embodied in a computer program product or in a system comprising a computer processor and a memory coupled to the processor, the memory being encoded with one or more programs that may perform the methods disclosed herein. Furthermore, while the current invention may be described in relation to SCTP, the skilled artisan will appreciate that it may be utilized in connection with a variety of data transfer protocols and applications in which initiation requests are sent by clients prior to association between a client and a server.

Figure 2:
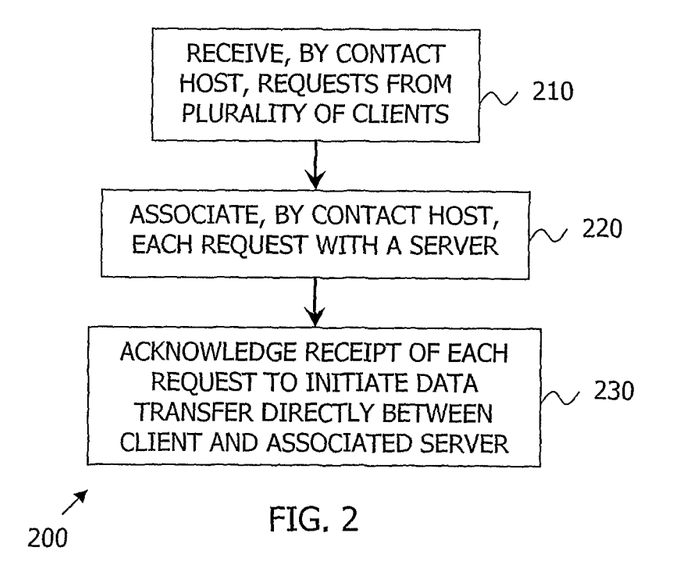
FIG. 2 is a process flow diagram illustrating a method embodiment of the current invention.

With reference to FIG. 2, a process flow diagram 200 is illustrated relating to a method for handling initiation requests that are directed to a contact host from a plurality of clients. The method commences, at step 210, with the (server) contact host receiving the requests. After the requests have been received, at step 220, the contact host associates each request with a server. Thereafter, at step 230, an acknowledgment of the receipt of each request is sent to the requesting client so that data transfer may subsequently commence directly between the client and the associated server. Optionally, the contact host may also authenticate each request (and/or client sending request) to provide, inter alia, further protection against a DoS attack.

Figure 3:
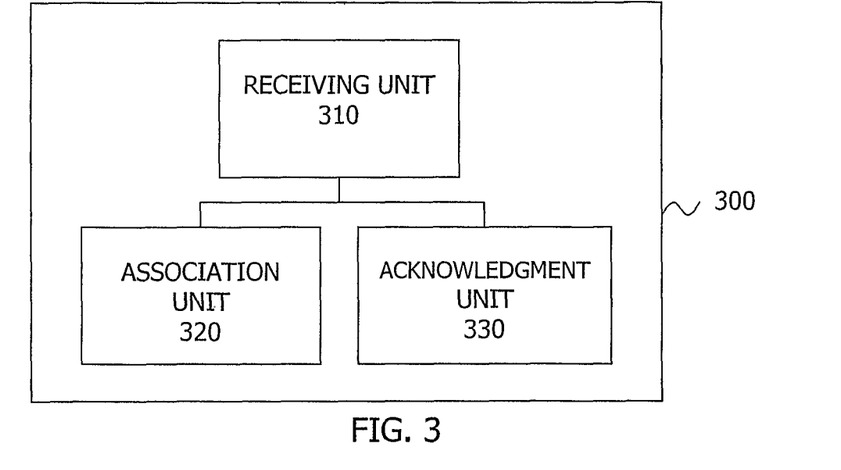
FIG. 3 is a schematic diagram illustrating an apparatus embodiment of the current invention.

FIG. 3 illustrates a contact host 300 that is configured to handle initiation requests received from a plurality of clients. A receiving unit 310 receives the requests from the various clients. An association unit 320 associates each received request with a server, and an acknowledgment unit 330 initiates an acknowledgment to the requesting clients (either directly by the contact host or by the associated server). Optionally, the contact host 300 may further include an authentication unit 320 that authenticates each client sending a request (to, inter alia, further insulate the servers from a DoS attack). Variations to the embodiments of the current invention illustrated in FIGS. 2 and 3 as well as examples useful for understanding and implementing the current invention are discussed below and illustrated in FIGS. 4-7.

Figure 4:
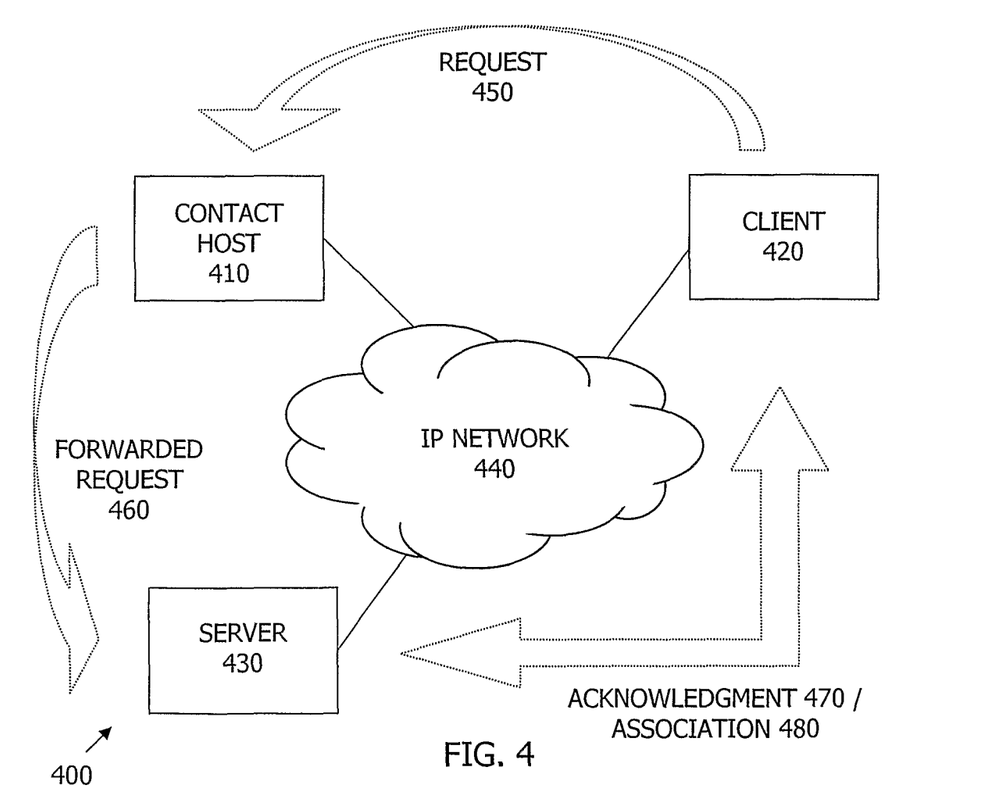
FIG. 4 is a schematic diagram of an example useful for understanding and the implementing the invention illustrating a client sending an initiation request to a contact host which subsequently forwards the request to a server which in turn sends an acknowledgement of the request to the client.

A schematic diagram 400 is illustrated in FIG. 4 that illustrates the relationship between a (server) contact host 410, a client 420, and at least one server 430 (or at least one cluster of servers), all of which are coupled via a network, such as an IP network 440. The client 420 may send an initiation request 450 (e.g., an INIT message in the case of SCTP) to the contact host 410 via the IP network 440. The contact host 410 may then authenticate the request (by, for example, determining whether the client 420 is allowed to communicate with the server 430). If the client 420 (and/or request 450) has not been authenticated, the contact host 410 may reply to the client 420 with an ABORT message (in the case of SCTP) or other termination message.

If the client 420 is authenticated (or if the contact host 410 is not configured to authenticate the client 420 and/or the request 450), the contact host 410 selects an appropriate server 430 to respond to and process the request 450. Once the server 430 has been selected, the contact host 410 forwards or otherwise relays the request 460 (or generates a new request having the required information) via the IP network 440 to the selected server 430 (which may require the exchange of several messages between the contact host 410 and the server 430 such as INIT and INIT ACK, etc. depending on the protocol). The server 430 may be selected based on a determination of how to balance/share the load among the various servers that are associated or otherwise coupled to the contact host 410 (e.g., based on performance statistics provided by each of the servers or by a load monitor that is coupled to the servers), or alternatively, the server 430 may be selected using a mechanism such as a round robin selection scheme. Alternatively, the server 430 may forward initiation messages to other members of a same cluster of servers until a suitable candidate among the various servers is identified.

The contact host 410, in order to ensure that the client 420 and the server 430 are associated (so that data may be transferred), may send an address configuration change message (ASCONF message in the case of SCTP) to the client 420 specifying the server 430 as the proper recipient of future messages. If an acknowledgment of the address configuration message (e.g., ASOCNF ACK in the case of SCTP, etc.) is received by the contact host 410, then the contact host 410 may then delete all state information related to the association. On the other hand, if the client 420 replies with an error message (e.g., ERROR in the case of SCTP) indicating an unrecognized chunk type, then the contact host 410 may silently discard incoming data messages and HEARTBEAT messages for the association. Thereafter, the client 420 may ultimately determine that the contact host 410 is inactive and will perform a fail-over to one of the other addresses belonging to the server 430.

The server 430, may send an acknowledgment 470 (e.g., INIT ACK message, etc.) in response to the request 450 via the IP network 440, so that an association 480 (e.g., a SCTP association, etc.) may be established between the server 430 and the client 420 (to facilitate, for example, data transfer between the server 430 and the client 420). Depending on the implementation, further hand-shaking signals may be exchanged between the server 430 and the client 420 prior to the commencement of the association. Furthermore, with this arrangement, any further messages related to the original request 450 received by the contact host 410 from the client 420, such as other initialization messages (e.g., COOKIE ECHO messages as described in RFC 2960, etc.) may be routed directly to the server 430 (so that the server 430 may directly respond thereto).

The acknowledgment 470 and/or other initialization messages by the server 430 to the client 420 includes a server address identifying the location where the server 430 will subsequently be contacted. The server address may be the "semi-permanently" assigned address belonging to the server 430, or it may be a dynamically assigned address. For example, the server 430 may dynamically assign addresses to some (or all) of its interfaces. This assignment may be generated through a technique such as Dynamic Host Configuration Protocol (DHCP), stateless/stateful automatic configuration, network address translation (NAT) or network address port translation (NAPT) or the like. With dynamic assignment, each association may be provided with its own real (IP address assigned to the server interfaces via DHCP) or virtual (address mapping via NAT) end point on the server 430.

Figure 5:
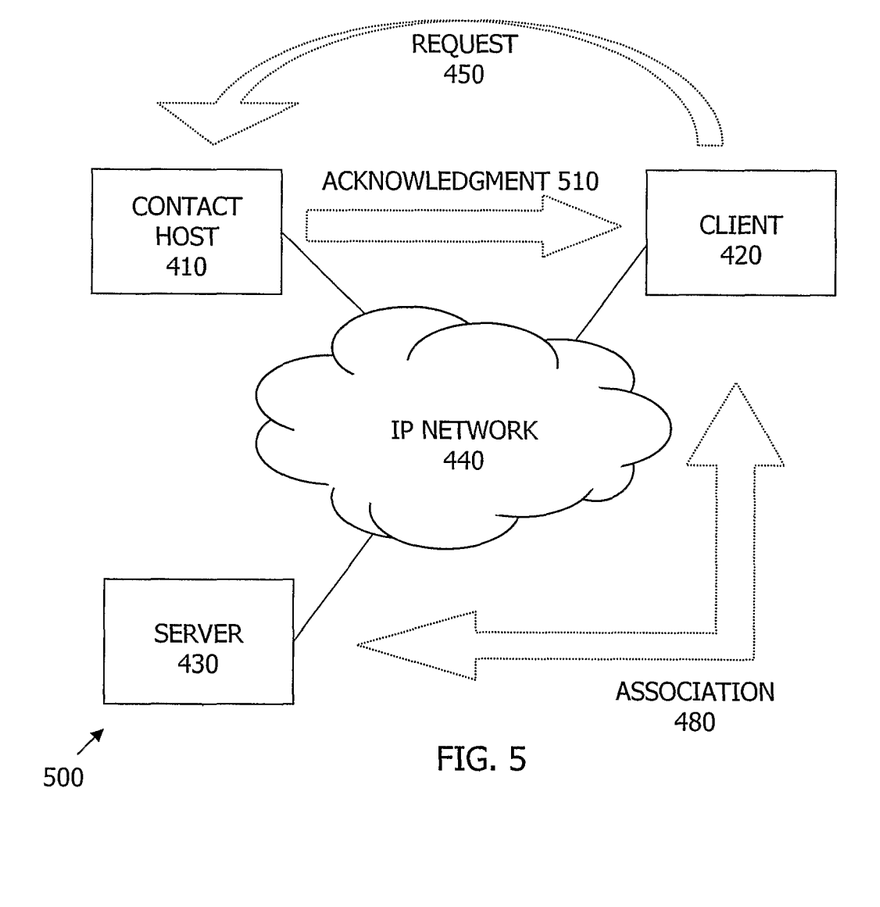
FIG. 5 is a schematic diagram of an example useful for understanding and the implementing the invention illustrating a client sending an initiation request to a contact host which sends an acknowledgement of the request identifying the server to the client.

FIG. 5 illustrates a schematic diagram 500 (where common signals and components of FIG. 4 are shown using the same reference numbers), where a client 420 sends a request to a contact host 410 and the contact host sends an acknowledgment 510 (e.g., INIT message, etc.) to the client. Thereafter, a server 430 and a client 420 establish an association 480. With this variation, the contact host 410 may perform the various steps relating to the initialization of the association 480 such as selecting the proper server 430 (which may include further signaling relating to the exchange of state information), preparing the state in the selected server 430 for a data trans-fer phase, and forcing the data transfer phase to be processed by the selected server 430 (e.g., by maintaining state information on the association and not answering to various chunks to act as a dead interface in order to force multi-homing in the client 420 to redirect traffic to the remaining addresses residing on the server 430). In contrast with the example of FIG. 4, the contact host 410 may optionally directly respond to various initialization messages (e.g., COOKIE ECHO messages, etc.) received from the client 420. Alternatively, the contact host 420 may simply discard messages other than initiation requests (e.g., DATA messages, HEARTBEAT messages, etc.), so that the contact host 410 is declared as unreachable by the client 420.

Figure 6:
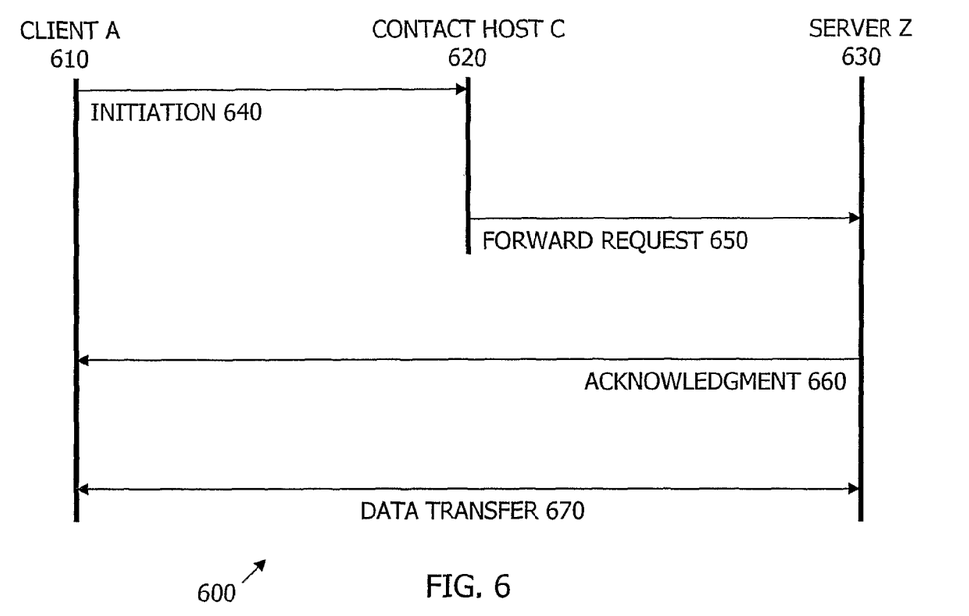
FIG. 6 is a signaling diagram of an example useful for understanding and the implementing the invention illustrating a client sending an initiation request to a contact host which subsequently forwards the request to a server which in turn sends an acknowledgement of the request to the client so that data transfer may be commenced between the server and client bypassing the contact host.

FIG. 6 illustrates an SCTP-based signaling diagram 600 among a client 610 (end point EP A) having associated IP addresses {IP A1, . . . , IP An} and a port P A, a contact host 620 (end point EP C) having associated IP addresses {IP C1, . . . , IP Co} and a port P Z, and a server 630 (end point EP Z) having associated IP addresses {IP Z1, . . . , IP Zm} and a port P Z. The client 610 may send an initiation request 640 to the contact host 620. This initiation request 640 may include information such as the following: destination IP address=IP Cw; source IP address=IP Ax (source port P A; destination port=P Z; chunk=INIT; end point IP addresses={IP A1, . . . , IP An}). After the contact host 620 determines to send the request to the server 630 (in a manner as described above), the request is forwarded 650 (or another message is generated containing the information within the request) to the server 630. The server 630 then responds to the client 610 with an acknowledgment 660 that may contain information such as the following: destination IP address=IP Ax; source IP address=IP Zz (source port=P Z; destination port=P A; chunk=INIT ACK; end point IP addresses={IP Z1, . . . , IP Zm}). Thereafter, the client 610 and the server 630 may commence data transfer (or other association) that bypasses or otherwise does not utilize the functionalities of the contact host 620.

Figure 7:
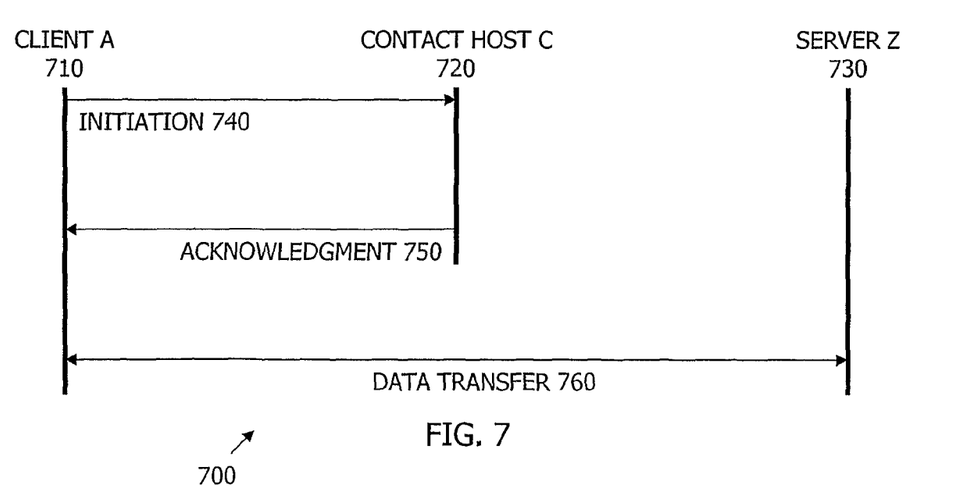
FIG. 7 is a signaling diagram of an example useful for understanding and the implementing the invention illustrating a client sending an initiation request to a contact host which in turn sends an acknowledgement of the request to the client identifying the server so that data transfer may be commenced between the server and client bypassing the contact host.

FIG. 7 illustrates a further SCTP-based signaling diagram 700 among a client 710 (end point EP A) having associated IP addresses {IP A1, . . . , IP An} and a port P A, a contact host 720 (end point EP C) having associated IP addresses {IP C1, . . . , IP Co} and a port P Z, and a server 730 (end point EP Z) having associated IP addresses {IP Z1, . . . , IP Zm} and a port P Z. The client 710 may send an initiation request 740 to the contact host 720. This initiation request 740 may include information such as the following: destination IP address=IP Cw; source IP address=IP Ax (source port=P A; destination port=P Z; chunk=INIT; end point IP addresses={IP A1, . . . , IP An}). After the contact host 720 determines to send the request to the server 630 (in a manner as described above), and sends an acknowledgement 750 to the client 710. The acknowledgement 750 may contain information such as the following: destination IP address=IP Ax; source IP address=IP Zz (source port=P Z; destination port=P A; chunk=INIT ACK; end point IP addresses={IP Z1, . . . , IP Zm}). Thereafter, the client 710 and the server 730 may commence data transfer that bypasses or otherwise does not utilize the contact host 720.

Depending on the desired implementation, various modifications may be made to the configuration of the invention. For example, the contact host may be a dedicated machine that resided on a separate physical resource than the server. In other variations, the contact host is located on the same physical resource as the server (although such server may not ultimately be selected or associated by the contact host). Furthermore, the servers may belong to the same network node (i.e., they all offer connectivity to the same application service, such as the application layer above SCTP). In contrast, the servers may belong to different network nodes while offering the same application service.

Load balancing may be accomplished by determining various characteristics of the servers associated with the contact host, such as protocol processing capability (i.e., the processing performance occupied by processing a protocol packet), memory occupation (i.e., memory required for queue processing), and link capacity. In addition, the contact host may periodically poll the various servers, or in the alternative, a load balancing monitor, to determine where to allocate future associations.

As can be appreciated from the above, the use of a contact host shields the servers from attacks by acting like a firewall (i.e., by filtering unwanted requests). The IP addresses of the actual servers are not provided to the client prior to the publication in an initiation message such as INIT. Therefore, on-going data transfers (e.g., SCTP associations), are not affected by unwanted requests which tend to occupy server processing characteristics. Furthermore, the contact host offers a single contact address and hides a potential server distribution over several resources to the requesting clients. This distribution may be conducted in a manner of techniques, such as load balancing or round robin distribution, to more evenly apply load sharing.

Moreover, as the contact host facilitates the generation of an acknowledgment to each request, for example by (i) routing each request to an associated server and having the associated server acknowledge the request; or (ii) responding itself to each request with an acknowledgment (including the transport address(es) of an associated server), data transfer may be initiated directly between the client and the associated server without further intervention or mediation by the contact host. Although in some variations, the contact host may route or otherwise handle messages relating to the initiation of data transfer, there is no direct involvement by the contact host during data transfer (it may in this context be bypassed). In contrast, routers or other devices handle data during various stages of data transfer. By limiting messaging transactions handled by the contact hosts to the initiation of data transfer, rather than data transfer itself, the processing power of the contact hosts is not detrimentally affected during transfer of large amounts of data and they can continue to accept requests from numerous clients and facilitate the generation of acknowledgments that will subsequently be used to initiate data transfer.

While the current invention has been described with respect to particular embodiments (including certain system arrangements and certain orders of steps within various methods), those skilled in the art will recognize that the current invention is not limited to the specific embodiments described and illustrated herein. Therefore, while the present invention has been described in relation to its preferred embodiments, it is to be understood that this disclosure is only illustrative. Accordingly, it is intended that the invention be limited only by the scope of the claims appended hereto.

The invention claimed is:

1. A method for handling initiation requests directed to a multi-homed contact host from a plurality of multi-homed clients, the initiation requests requesting initiation of data transfers between the plurality of multi-homed clients and a plurality of multi-homed servers, the method comprising the steps of:
   providing the contact host with a single IP address to accept requests from the plurality of multi-homed clients, allowing direct access to one of a plurality of multi-homed servers;
   receiving, by the contact host, a first initiation request using a streaming control transport protocol from a first one of the plurality of multi-homed clients;
   associating, by the contact host, the first initiation request with one of the multi-homed servers according to a round robin scheme;
   authenticating, by the contact host, the first initiation request;
   acknowledging, by the contact host, the first initiation request to initiate a data transfer directly between the first multi-homed client and the associated multi-homed server, the data transfer bypassing the contact host, wherein the contact host acknowledges the first initiation request directly to the corresponding first multi-homed client rather than the associated multi-homed server acknowledging the first initiation request;
   limiting request messaging transactions, handled by the contact host, to initiation of data transfer by sending a message to the client specifying the multi-homed server as recipient of further messages; and
   the contact host discarding any subsequent messages received by the contact host after commencing data transfer between the first multi-homed client and the associated multi-homed server, causing the first multi-homed client to classify the contact host as non-responsive and thereby prevent network overload.

2. The method of claim 1, further comprising the step of: receiving, by the associated multi-homed server from the first multi-homed client, a confirmation that data transfer is to commence.

3. The method of claim 1, further comprising the step of: receiving, by the contact host from the first multi-homed client confirmation that data transfer is to commence.

4. The method of claim 1, wherein each acknowledgment includes at least one IP address for the associated multi-homed server.

5. The method of claim 1, wherein the subsequent messages from the first multi-homed client are discarded by the contact host without notifying the first multi-homed client.

6. The method of claim 1, wherein the step of acknowledging further comprises acknowledging said streaming control transport protocol, wherein the acknowledgement is adapted to comprise a plurality of IP addresses of the associated multi-homed server.

7. A contact host for handling initiation requests received from a plurality of multi-homed clients, the initiation requests requesting initiation of data transfers between the plurality of multi-homed clients and a plurality of multi-homed servers, the contact host having a single IP address to accept requests to initially prevent direct access to the plurality of multi-homed servers by the clients, the contact host comprising:
   a receiving unit for receiving a first initiation request using a streaming control transport protocol from a first one of the plurality of multi-homed clients and for receiving an error message from the first multi-homed client whereupon the contact host discards further messages from the first multi-homed client without notifying the first multi-homed client, causing the first multi-homed client to classify the contact host as non-responsive and thereby prevent network overload;
   an association unit for associating the first initiation request with one of the multi-homed servers according to a round robin scheme; and
   an acknowledgment unit for acknowledging the first initiation request to initiate a data transfer directly between the first multi-homed client and the associated multi-homed server, the data transfer bypassing the contact host, wherein the contact host acknowledges the first initiation request directly to the corresponding first multi-homed client rather than the associated multi-homed server acknowledging the first initiation request.

8. A system, comprising:
   a plurality of multi-homed clients for generating data transfer initiation requests;
   a plurality of multi-homed servers for handling the data transfer requested by said plurality of multi-homed clients; and
   a contact host for handling initiation requests received from said plurality of multi-homed clients, wherein request messaging transactions are limited to initiation of the data transfer, the contact host having a single IP address to accept requests to initially prevent direct access to the plurality of multi-homed servers by the clients, the contact host comprising:
      a receiving unit for receiving a first initiation request using a streaming control transport protocol from a first one of the plurality of multi-homed clients and for receiving an error message from the first multi-homed client whereupon the contact host discards further messages from the first multi-homed client without notifying the first multi-homed client, causing the first multi-homed client to classify the contact host as non-responsive and thereby prevent network overload;
      an association unit for associating the first initiation request with one of the multi-homed servers according to a round robin scheme; and
      an acknowledgment unit for acknowledging the first initiation request to initiate a data transfer directly between the first multi-homed client and the associated multi-homed server, the data transfer bypassing the contact host, wherein the contact host acknowledges the first initiation request directly to the corresponding first multi-homed client rather than the associated multi-homed server acknowledging the first initiation request.

9. The system of claim 8, further comprising the first multi-homed client's associated multi-homed server having means for receiving from the first multi-homed client, a confirmation that data transfer is to commence.

10. The system of claim 8, further comprising means for receiving, by the contact host from the first multi-homed client, confirmation that data transfer is to commence.

11. The system of claim 8, wherein each acknowledgment includes at least one IP address for the associated multi-homed server.

* * * * *